United States Patent
Li et al.

(10) Patent No.: US 12,331,189 B2
(45) Date of Patent: Jun. 17, 2025

(54) FLAME RETARDANT COMPOSITION COMPRISING A POLYSILOXANE

(71) Applicant: SABIC GLOBAL TECHNOLOGIES B.V., Bergen Op Zoom (NL)

(72) Inventors: Yuqi Li, Blue Bell, PA (US); Jinfeng Zhuge, Downingtown, PA (US); Xin Chen, Malvern, PA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 955 days.

(21) Appl. No.: 17/258,884

(22) PCT Filed: Aug. 23, 2019

(86) PCT No.: PCT/US2019/047863
§ 371 (c)(1),
(2) Date: Jan. 8, 2021

(87) PCT Pub. No.: WO2020/041677
PCT Pub. Date: Feb. 27, 2020

(65) Prior Publication Data
US 2021/0292549 A1    Sep. 23, 2021

Related U.S. Application Data

(60) Provisional application No. 62/722,361, filed on Aug. 24, 2018.

(51) Int. Cl.
| | |
|---|---|
| *C08L 69/00* | (2006.01) |
| *C08K 3/34* | (2006.01) |
| *C08K 5/00* | (2006.01) |
| *C08K 5/521* | (2006.01) |
| *C08K 5/524* | (2006.01) |
| *C08L 27/18* | (2006.01) |
| *C08L 83/10* | (2006.01) |
| *C08L 83/16* | (2006.01) |

(52) U.S. Cl.
CPC ............... *C08L 69/00* (2013.01); *C08K 3/34* (2013.01); *C08K 5/005* (2013.01); *C08K 5/0066* (2013.01); *C08K 5/521* (2013.01); *C08K 5/524* (2013.01); *C08L 27/18* (2013.01); *C08L 83/10* (2013.01); *C08L 83/16* (2013.01); *C08L 2201/02* (2013.01)

(58) Field of Classification Search
None
See application file for complete search history.

(56) References Cited

U.S. PATENT DOCUMENTS

| | | |
|---|---|---|
| 4,154,775 A | 5/1979 | Axelrod |
| 4,404,350 A | 9/1983 | Ryang |
| 5,229,482 A | 7/1993 | Brunelle |
| 5,449,710 A | 9/1995 | Umeda et al. |
| 5,693,700 A * | 12/1997 | Venkataramani ........ C08K 3/30 524/80 |
| 6,184,312 B1 | 2/2001 | Yamamoto et al. |
| 7,652,083 B2 | 1/2010 | Mullen |
| 7,834,075 B2 | 11/2010 | Buchholz et al. |
| 8,026,303 B2 | 9/2011 | Levchik et al. |
| 8,138,295 B2 | 3/2012 | Kim et al. |
| 9,163,121 B2 | 10/2015 | Minemura et al. |
| 2007/0225441 A1 | 9/2007 | Wenz |
| 2009/0088514 A1 | 4/2009 | Shiping |
| 2011/0052895 A1 | 3/2011 | Li et al. |
| 2012/0251750 A1 * | 10/2012 | Sybert ..................... C08L 69/00 521/134 |
| 2013/0131241 A1 | 5/2013 | Van De Grampel et al. |
| 2013/0274391 A1 | 10/2013 | An et al. |
| 2013/0317142 A1 | 11/2013 | Chen et al. |
| 2014/0018491 A1 * | 1/2014 | Moniruzzaman ........ C08J 5/042 524/495 |
| 2014/0058025 A1 | 2/2014 | Meyer et al. |
| 2014/0295363 A1 | 10/2014 | Sun et al. |
| 2014/0353544 A1 * | 12/2014 | Guo ....................... C08K 5/523 252/75 |
| 2016/0122534 A1 | 5/2016 | Zhou et al. |
| 2016/0257794 A1 | 9/2016 | Grimm et al. |
| 2018/0155544 A1 * | 6/2018 | Lee ......................... C08L 69/00 |

FOREIGN PATENT DOCUMENTS

| | | |
|---|---|---|
| DE | 10014608 A1 | 9/2001 |
| EP | 2787041 A1 | 10/2014 |
| WO | 2014072923 A1 | 5/2014 |

(Continued)

OTHER PUBLICATIONS

International Search Report for International Application No. PCT/US2019/047863, International Filing Date Aug. 23, 2019, Date of Mailing Nov. 28, 2019, 6 pages.
UL 94, "Tests for Flammability of Plastic Materials for Parts in Devices and Appliances", Underwriters Laboratories, Inc. (UL), Dec. 12, 2003, 52 pages.

(Continued)

*Primary Examiner* — Tanisha Diggs
(74) *Attorney, Agent, or Firm* — CANTOR COLBURN LLP

(57) ABSTRACT

In an embodiment, a flame retardant composition comprises 60 to 95 wt % of a polycarbonate: a poly siloxane comprising a repeat unit of the formula (7): wherein the composition comprises 0.5 to 2 wt % of the repeat unit of the formula (7) of the polysiloxane: wherein the polysiloxane is free of one or both of a vinyl graft and repeat units derived from a vinyl monomer: 9 to 18 wt % of talc: 5 to 15 wt % of a phosphorus containing flame retardant: 0 to 1 wt % of a phosphite stabilizer; and 0.1 to 2 wt % of an anti-drip agent.

14 Claims, No Drawings

(56) References Cited

FOREIGN PATENT DOCUMENTS

| WO | 2015022676 A1 | 2/2015 |
| WO | 2016028960 A1 | 2/2016 |
| WO | 2016103161 A1 | 6/2016 |

OTHER PUBLICATIONS

Written Opinion for International Application No. PCT/US2019/047863, International Filing Date Aug. 23, 2019, Date of Mailing Nov. 28, 2019, 7 pages.

* cited by examiner

FLAME RETARDANT COMPOSITION COMPRISING A POLYSILOXANE

CROSS-REFERENCE TO RELATED APPLICATIONS

This application is a National Stage application of PCT/US2019/047863, filed Aug. 23, 2019, which claims the benefit of U.S. Provisional Application No. 62/722,361, filed Aug. 24, 2018, both of which are incorporated by reference in their entirety herein.

BACKGROUND

Flame retardant polycarbonate compositions capable of achieving a ULV0 rating in accordance with the Underwriters Laboratories flammability testing are widely prepared and used, especially in a wide variety of electrical and electronic applications. Conversely, only a very limited set of polycarbonates are used in aircraft and other transportation applications. Particularly, use as interior parts in these applications is limited as stringent flammability safety requirements including smoke density, flame spread, and heat release values that the polycarbonate compositions must meet have been implemented. For example, in the United States, Federal Aviation Regulation (FAR) Part 25.853 sets forth the airworthiness standards for aircraft compartment interiors. The safety standards for aircraft and transportation systems used in the United States include a smoke density test specified in FAR 25.5 Appendix F, Part V Amdt 25-116. Flammability requirements include the "60 second test" specified in FAR 25.853 (a) Appendix F, Part I, (a), 1, (i) and the heat release rate standard (referred to as the Ohio State University (OSU) 65/65 standard) described in FAR F25.4 (FAR Section 25, Appendix F, Part IV), or the French flame retardant tests such as, NF—P-92-504 (flame spread) or NF—P-92-505 (drip test). In another example, the aircraft manufacturer Airbus has smoke density and other safety requirements set forth in ABD0031. These flammability safety requirements have been implemented so that, in the event of a fire, components made from materials meeting these requirements can increase the amount of time available for escape and provide for better visibility during a fire.

In view of the current interior material safety standards, and in anticipation of more stringent standards in the future, materials that exceed governmental and aircraft manufacturer flame safety requirements are sought.

BRIEF SUMMARY

Disclosed herein is a flame retardant composition comprising a polysiloxane.

In an embodiment, a flame retardant composition comprises 60 to 95 wt % of a polycarbonate based on the total weight of the flame retardant composition; a polysiloxane, wherein the polysiloxane comprises a repeat unit of the formula (7); wherein E has an average value of 2 to 100; R' is hydrogen or a $C_{1-4}$ alkyl group; and R" is a $C_{1-4}$ alkyl group; wherein the composition comprises 0.5 to 2 wt % of the repeat unit of the formula (7) of the polysiloxane based on the total weight of the flame retardant composition; wherein the polysiloxane is free of one or both of a vinyl graft and repeat units derived from a vinyl monomer; 9 to 18 wt % of talc based on the total weight of the flame retardant composition; 5 to 15 wt % of a phosphorus containing flame retardant based on the total weight of the flame retardant composition; 0 to 1 wt % of a phosphite stabilizer based on the total weight of the flame retardant composition; and 0.1 to 2 wt % of an anti-drip agent based on the total weight of the flame retardant composition.

The above described and other features are exemplified by the following detailed description and claims.

DETAILED DESCRIPTION

Despite extensive investigation, there are only a few materials that can meet the FAR standards and many of them are associated with high production costs severely limiting their use. It was surprisingly discovered that a flame retardant composition, comprising 60 to 95 weight percent (wt %) of a polycarbonate; a polysiloxane, wherein the polysiloxane comprises a repeat unit of the formula (7);

wherein E has an average value of 2 to 100; R' is hydrogen or a $C_{1-4}$ alkyl group; and R" is a $C_{1-4}$ alkyl group; wherein the composition comprises 0.5 to 2 wt % of the repeat unit of the formula (7) of the polysiloxane; 9 to 18 wt % of talc; 5 to 15 wt % of a phosphorus containing flame retardant; 0 to 1 wt % of a phosphite stabilizer; and 0.1 to 2 wt % of an anti-drip agent was surprisingly capable of passing the OSU 65/65 test achieving a 2 minute integrated heat release rate of less than or equal to 65 kilowatt-minutes per square meter and a peak heat release rate of less than 65 kilowatts per square meter. Unless otherwise indicated, all weight percent values noted herein are based on the total weight of the flame retardant composition.

The flame retardant composition comprises 60 to 95 wt %, or 70 to 85 wt %, or 73 to 83 wt % of a polycarbonate (also referred to herein as the polycarbonate) based on the total weight of the flame retardant composition. The polycarbonate can comprise a branched polycarbonate having statistically more than two end groups. The polycarbonate can have a weight average molecular weight of 20,000 to 60,000 grams per mole (g/mol), or 20,000 to 40,000 g/mol as measured by gel permeation chromatography using polycarbonate standards.

"Polycarbonate" as used herein means a homopolymer or copolymer having repeating structural carbonate units of the formula (1);

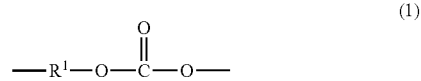

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates are generally manufactured from bisphenol compounds such as 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxyphenyl)-3,3,5-trimethylcyclohexane (isophorone), or a combination comprising at least one of the foregoing bisphenol compounds can also be used. In a specific embodiment, the polycarbonate is a homopolymer derived from BPA; a copolymer derived from BPA and another bisphenol or dihydroxy aromatic compound such as resorcinol; or a copolymer derived from BPA and optionally another bisphenol or dihydroxyaromatic compound, and further comprising non-carbonate units, for example, aromatic ester units such as resorcinol terephthalate or isophthalate, aromatic-aliphatic ester units based on $C_{6-20}$ aliphatic diacids, or a combination comprising at least one of the foregoing. The polycarbonate can be free of siloxane repeat units. Combinations comprising linear polycarbonates and branched polycarbonates can be used.

The polycarbonate can be manufactured by an interfacial polymerization, for example, as described in WO 2013/175448 A1 and WO 2014/072923 A1.

A branching agent can be added during polymerization to form a branched polycarbonate. The branching agent can include a polyfunctional organic compound containing at least three functional groups, for example, at least one of hydroxyl, carboxyl, carboxylic anhydride, or haloformyl functional groups. Such branching agents include aromatic triacyl halides, for example, triacyl chlorides of formula (20), wherein $Z^1$ is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (21), wherein $T^1$ is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, y is 0 to 4; or a compound of formula (22) (isatin-bis-phenol).

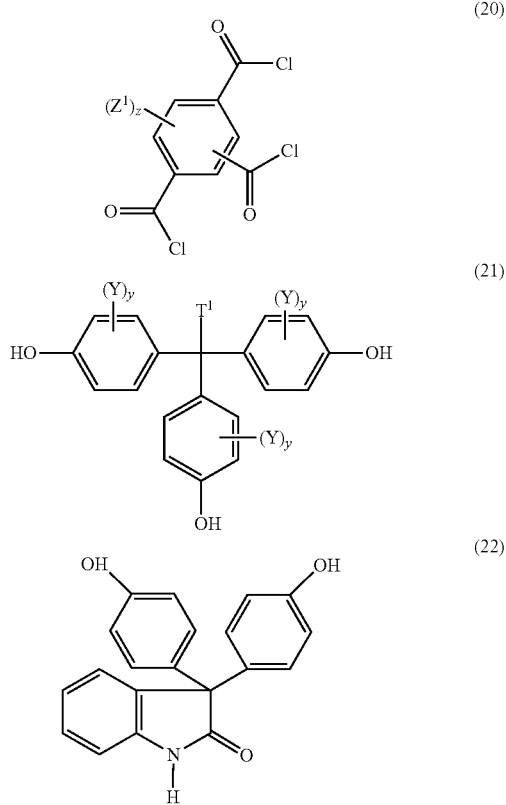

The branching agent can comprise trimellitic acid, trimellitic anhydride, trimellitic trichloride, tris-p-hydroxyphenylethane, isatin-bis-phenol, tris-phenol TC (1,3,5-tris((p-hydroxyphenyl) isopropyl)benzene), tris-phenol PA (4 (4 (1,1-bis(p-hydroxyphenyl)-ethyl) alpha, alpha-dimethyl benzyl) phenol), 4-chloroformyl phthalic anhydride, trimesic acid, benzophenone tetracarboxylic acid, or a combination comprising at least one of the foregoing. The branching agent can comprise trimellitic acid, trimellitic anhydride, tris-phenol TC (1,3,5-tris((p-hydroxyphenyl) isopropyl)benzene), tris-phenol PA (4 (4 (1,1-bis(p-hydroxyphenyl)-ethyl) alpha, alpha-dimethyl benzyl) phenol), 4-chloroformyl phthalic anhydride, trimesic acid, benzophenone tetracarboxylic acid, or a combination comprising at least one of the foregoing. The branching agent can comprise trimellitic trichloride (TMTC), tris-p-hydroxyphenylethane (THPE), isatin-bis-phenol, or a combination comprising at least one of the foregoing. The branching agent can comprise tris-p-hydroxyphenylethane.

If desired, the branching agent is added in an amount (relative to the bisphenol monomer) that is sufficient to achieve the desired branching content, that is, more than two end groups. The amount of the branching agents used in the manufacture of the polymer will depend on a number of considerations, for example the type of $R^1$ groups, the amount of an end-capping agent, for example, cyanophenol, and the desired molecular weight of the polycarbonate. In general, the amount of branching agent is effective to provide 0.1 to 10 branching units per 100 $R^1$ units, or 0.5 to 8 branching units per 100 $R^1$ units, or 0.75 to 5 branching units per 100 $R^1$ units. For branching agents having formula (20), the branching agent can be present in an amount to provide 0.1 to 10 triester branching units per 100 $R^1$ units, or 0.5 to 8, or 0.75 to 5 triester branching units per 100 $R^1$ units. For branching agents having formula (21), the branching agent can be added in an amount effective to provide 0.1 to 10 triphenyl carbonate branching units per 100 $R^1$ units, or 0.5 to 8, or 2.5 to 3.5 triphenylcarbonate units per 100 $R^1$ units. The branched polycarbonate can have a branching level of 2 to 6%, or 2 to 4% wherein the branching level is equal to the total moles of branching units divided by the total moles of bisphenol repeat units times 100.

The molecular weight of the polycarbonate can become very high upon addition of the branching agent, and to avoid excess viscosity during polymerization, an end-capping agent can be used, relative to the amount used when the particular branching agent is not present. The amount of end-capping agent used can be 5 to 20 mole percent (mol %) based on the total moles of bisphenol monomer.

The end-capping agent can be included during polymerization to provide end groups. The end-capping agent can comprise a monocyclic phenol (for example, phenol, p-cyanophenol, and $C_{1-22}$ alkyl-substituted phenols (for example, p-cumyl-phenol, p-butyl phenol, and tertiary-butyl phenol)), monoethers of diphenols (for example, p-methoxyphenol), monoesters of diphenols (for example, resorcinol monobenzoate), functionalized chlorides of aliphatic monocarboxylic acids (for example, (meth)acryoyl chloride), mono-chloroformates (for example, phenyl chloroformate, alkyl-substituted phenyl chloroformates, p-cumyl phenyl chloroformate, and toluene chloroformate), 4-substituted-2-hydroxybenzophenones and their derivatives, aryl salicylates, 2-(2-hydroxyaryl)-benzotriazoles and their derivatives, 2-(2-hydroxyaryl)-1,3,5-triazines and their derivatives, monocarboxylic acid chlorides (for example, benzoyl chloride, $C_{1-22}$ alkyl-substituted benzoyl chloride, toluoyl chloride, bromobenzoyl chloride, cinnamoyl chloride, and 4-nadimidobenzoyl chloride), polycyclic or mono-carboxylic acid chlorides (for example, trimellitic anhydride chloride and naphthoyl chloride), functionalized chlorides of aliphatic monocarboxylic acids (for example, (meth)acryoyl chloride), mono-chloroformates (for example, phenyl chloroformate, alkyl-substituted phenyl chloroformates, p-cumyl phenyl chloroformate, and toluene chloroformate), or a combination comprising at least one of the foregoing. The end-capping agent can comprise phenol, p-t-butylphenol, p-cumylphenol, or a combination comprising at least one of the foregoing.

The polycarbonate can comprise a branched polycarbonate having a branching level of than or equal to 3% and end-capping groups derived from an end-capping agent having a pKa between 8.3 and 11. The branching agent can comprise trimellitic trichloride, 1,1,1-tris(4-hydroxyphenyl) ethane, or a combination comprising at least one of the foregoing. The end-capping agent can comprise phenol or a phenol containing a substituent of cyano group, aliphatic groups, olefinic groups, aromatic groups, halogens, ester groups, ether groups, or a combination comprising at least one of the foregoing. For example, the end-capping agent can comprise phenol, p-t-butylphenol, p-methoxyphenol, p-cyanophenol, p-cumylphenol, or a combination comprising at least one of the foregoing.

An exemplary branched polycarbonate includes a branched, cyanophenol end-capped bisphenol A homopolycarbonate produced via interfacial polymerization, having a branching level of 3% derived from a 1,1,1-tris(4-hydroxyphenyl) ethane (THPE) branching agent, commercially available under the trade name LEXAN CFR commercially available from SABIC Innovative Plastics.

The flame retardant composition comprises a polysiloxane, wherein the polysiloxane comprises a repeat unit of the formula (7);

wherein E has an average value of 2 to 200, or 2 to 100, or 50 to 100, or 10 to 60; R' is hydrogen or a $C_{1-4}$ alkyl group; and R" is a $C_{1-4}$ alkyl group. The flame retardant composition comprises 0.5 to 2 wt %, or 1 to 2 wt %, or 1.5 to 2 wt % of the repeat unit of the formula (7) of the polysiloxane based on the total weight of the flame retardant composition.

The polysiloxane can comprise a polydimethylsiloxane wherein R' and R" are methyl. The polysiloxane can comprise a polymethylhydrosiloxane wherein R' is hydrogen and R" is methyl.

The polysiloxane can be free of a substituent phenyl or phenyl containing R' and R" group, where none of the silicon atoms in the polysiloxane can be bonded to a phenyl or phenyl containing R' or R" group. Greater than or equal to 95 mol %, or 99 to 100 mol % of the repeat units comprising a silicon atom in the polysiloxane can have the formula (7).

The polysiloxane can comprise a vinyl functionality such as a (meth)acryloyloxy functionality. For example, the polysiloxane can comprise a (meth)acryloyloxy endgroup or the (meth)acryloyloxy functionality can be bonded to a silicon atom in the backbone of the polysiloxane. For example, the vinyl functionality can be present on a repeat unit derived from a (meth)acryloyloxy silane monomer. The (meth)acryloyloxy silane monomer can comprise [β-(methacryloyloxy) ethyl]dimethoxy-methylsilane, [γ-(methacryloyloxy) propyl] methoxydimethylsilane, [γ-(methacryloyloxy) propyl] dimethoxymethylsilane, [γ-(methacryloyloxy) propyl] trimethoxysilane (also known as 3-(trimethoxysilyl) propyl methacrylate), [γ-(acryloyloxy) propyl] trimethoxysilane, [Y-(methacryloyloxy) propyl] ethoxydiethylsilane, [γ-(methacryloyloxy) propyl] dimethoxy-methylsilane, [δ-(methacryloyloxy)butyl] diethoxymethylsilane, or a combination comprising at least one of the foregoing. The polysiloxane can be derived from a monomer composition comprising 0 to 20 wt %, or 5 to 15 wt % of the (meth) acryloyloxy silane monomer based on a total weight of the monomers. Greater than 95 mol %, or 99 to 100 mol %, or 100 mol % of the vinyl functionalities in the polysiloxane can be ungrafted or unreacted prior to addition to the flame retardant composition.

The polysiloxane can be free of a vinyl graft. The polysiloxane can be free of a vinyl graft and can be free of repeat units derived from a vinyl monomer. In other words, if the polysiloxane comprises a vinyl functionality, a vinyl graft is not present. In other words, the vinyl functionality has not been radically polymerized. In other words, greater than or equal to 95 mol %, or 99 to 100 mol %, or 100 mol % of repeat units comprising a vinyl functionality are ungrafted i.e., have not been exposed to a subsequent polymerization after the polymerization of the polysiloxane. For example, the polysiloxane can be polymerized from a monomer composition comprising siloxane monomer units and siloxane monomer units comprising a vinyl functionality to form the polysiloxane, and the polymerized polysiloxane can be final polysiloxane used in the present composition; wherein no vinyl monomers (for example, styrene, alpha-methyl styrene, methyl (meth)acrylate, ethyl (meth)acrylate, (meth)acrylic acid, (meth)acrylonitrile, maleic anhydride, or N-phenyl maleimide) are added before, during, or after the polymerization. The polysiloxane can be free of repeat units derived from polymerization of the vinyl group of a vinyl monomer.

The polysiloxane can comprise a poly(etherimide-siloxane) copolymer such as SILTEM™ commercially available from SABIC's Innovative Plastics business. The poly (etherimide-siloxane) copolymer can comprise more than 1, or 2 to 1,000, or 5 to 500, or 10 to 100 structural units of formula (41);

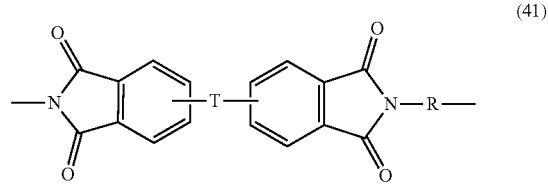

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In some embodiments R is divalent group of one or more of the following formulas (42);

(42)

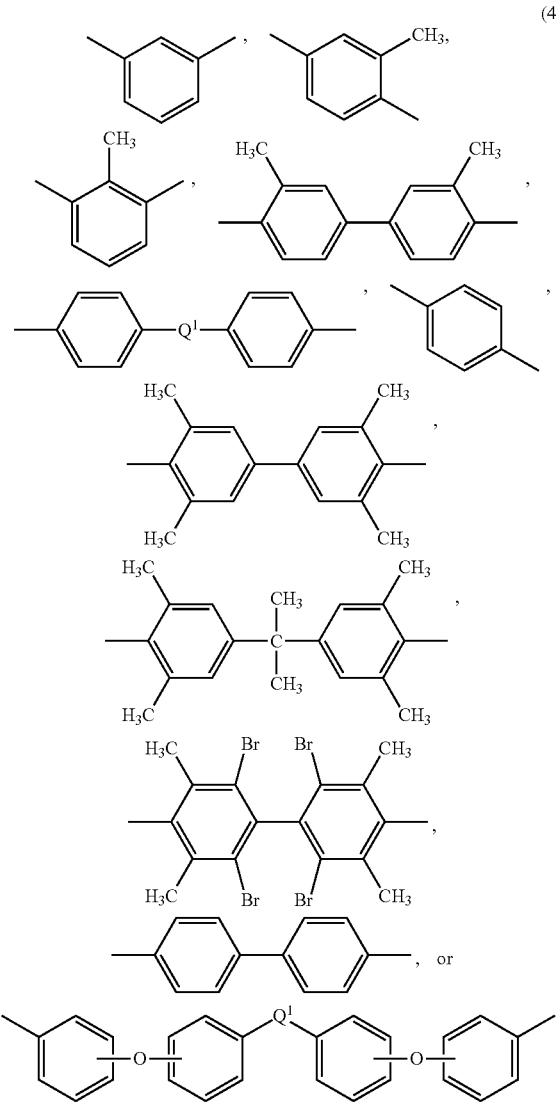

wherein Q¹ is —O—, —S—, —C(O)—, —SO₂—, —SO—, —P(R$^a$) (=O)— wherein R$^a$ is a $C_{1-8}$ alkyl or $C_{6-12}$ aryl, —$C_yH_{2y}$— wherein y is an integer from 1 to 5 or a halogenated derivative thereof (which includes perfluoroalkylene groups), or —$(C_6H_{10})_e$— wherein e is an integer from 1 to 4. R can be m-phenylene, p-phenylene, or a diarylene sulfone, in particular bis(4,4'-phenylene) sulfone, bis(3,4'-phenylene) sulfone, bis(3,3'-phenylene) sulfone, or a combination comprising at least one of the foregoing. At least 10 mol %, or at least 50 mol % of the R groups can contain sulfone groups, or no R groups can contain sulfone groups.

Further in formula (41), T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups of formula (43);

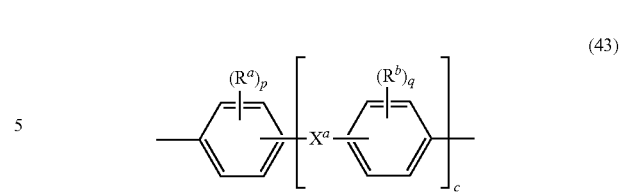

wherein R$^a$ and R$^b$ are each independently the same or different, and are a halogen atom or a monovalent $C_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group X$^a$ can be a single bond, —O—, —S—, —S(O)—, —S(O)₂—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (43a);

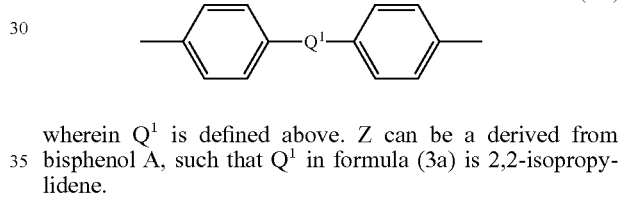

wherein Q¹ is defined above. Z can be a derived from bisphenol A, such that Q¹ in formula (3a) is 2,2-isopropylidene.

In formula (41), R can be m-phenylene, p-phenylene, or a combination comprising at least one of the foregoing, and T can be —O—Z—O— wherein Z is a divalent group of formula (43a), and Q¹ can optionally be 2,2-isopropylidene. Alternatively, the polyetherimide can be a copolymer comprising additional structural polyetherimide units of formula (41) wherein at least 50 mol % of the R groups are bis(4,4'-phenylene) sulfone, bis(3,4'-phenylene) sulfone, bis(3,3'-phenylene) sulfone, or a combination comprising at least one of the foregoing and the remaining R groups can be p-phenylene, m-phenylene or a combination comprising at least one of the foregoing; and Z can be 2,2-(4-phenylene) isopropylidene, i.e., a bisphenol A moiety.

In some embodiments, the polyetherimide is a copolymer that optionally comprises additional structural imide units that are not polyetherimide units, for example imide units of formula (44);

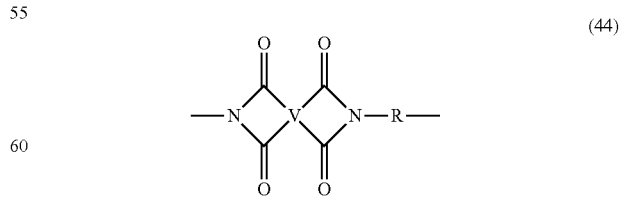

wherein R is as described in formula (41) and each V is the same or different, and is a substituted or unsubstituted $C_{6-20}$ aromatic hydrocarbon group, for example, a tetravalent linker of the formulas:

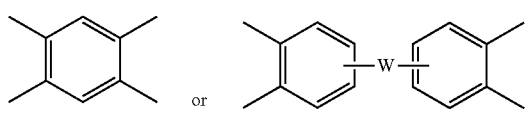

wherein W is a single bond, —O—, —S—, —C(O)—, —SO$_2$—, —SO—, a C$_{1-18}$ hydrocarbylene group, —P(R$^a$)(=O)— wherein R$^a$ is defined above. These additional structural imide units can comprise less than 20 mol % of the total number of units, and can be present in amounts of 0 to 10 mol % of the total number of units, or 0 to 5 mol % of the total number of units, or 0 to 2 mol % of the total number of units. In some embodiments, no additional imide units are present in the polyetherimide.

The poly(etherimide-siloxane) copolymer can have the formula (49) or (50);

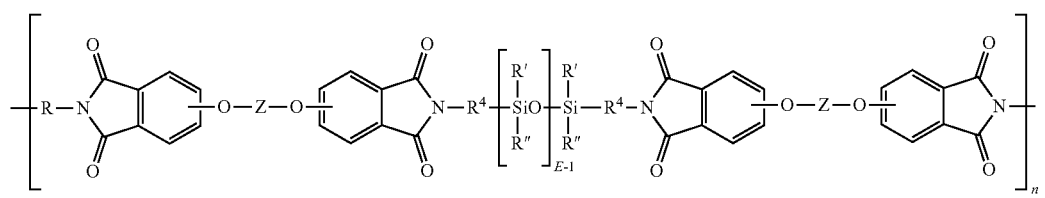

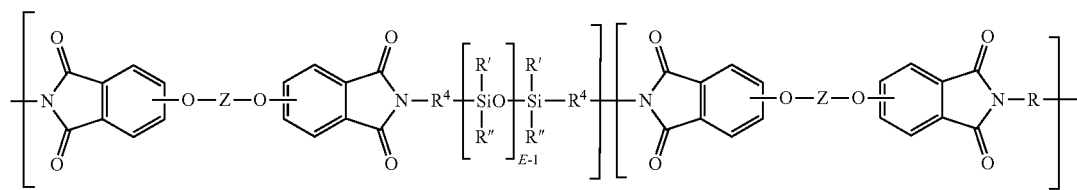

wherein R is a substituted or unsubstituted C$_{6-20}$ aromatic hydrocarbon group, a substituted or unsubstituted C$_{4-20}$ alkylene group, a substituted or unsubstituted C$_{3-8}$ cycloalkylene group, or a halogenated derivative of any of the foregoing; R' is hydrogen or a C$_{1-4}$ alkyl group; R" is a C$_{1-4}$ alkyl group; each R$^4$ is independently a C$_{2-20}$ arylene, alkylene, or arylenealkylene group; each Z is independently an aromatic C$_{6-24}$ monocyclic or polycyclic moiety optionally substituted with one or both of 1 to 6 C$_{1-8}$ alkyl groups and 1 to 8 halogen atoms, provided that the valence of Z is not exceeded; E has an average value of 2 to 50; and n is an integer from 5 to 100. For example, R can be a phenylene group; R' can be a methyl group; R" can be a methyl group; each R$^4$ can be n-propylene; and each Z can be a residue of bisphenol A.

The flame retardant composition can further comprise a phenyl containing siloxane, for example, octaphenyl cyclotetrasiloxane or a poly(phenylmethylsiloxane).

The flame retardant composition comprises 10 to 15 wt %, or 11 to 13 wt % of the talc. The talc can include fibrous talc, modular talc, needle shaped talc, lamellar talc, or a combination comprising at least one of the foregoing. The talc can have a median particle size of 0.5 to 10 micrometers, or 1 to 5 micrometers, or 2 to 4 micrometers. Particle size can be determined using light scattering methods or by image analysis of at least 100 particles. The median particle size can be based on a longest dimension of the talc.

The flame retardant composition can comprise an additional mineral filler other than talc. The additional mineral filler can comprise mica; wollastonite; silicates or silica powders, for example, aluminum silicate (mullite), synthetic calcium silicate, zirconium silicate, crystalline silica graphite, or natural silica sand; boron powders, for example, boron-nitride powder or boron-silicate; oxides, for example, TiO$_2$, aluminum oxide, or magnesium oxide; calcium sulfate (as its anhydride, dihydrate, or trihydrate); calcium carbonates, for example, chalk, limestone, marble, or synthetic precipitated calcium carbonates; glass spheres, for example, hollow or solid glass spheres, silicate spheres, cenospheres, or aluminosilicate (armospheres); single crystal fibers or "whiskers", for example, silicon carbide, alumina, boron carbide, iron, nickel, or copper; fibers (including continuous or chopped fibers), for example, asbestos, carbon fibers, aluminum silicates, aluminum oxides, magnesium oxides, or calcium sulfate hemihydrate or glass fibers, such as E, A, C, ECR, R, S, D, or NE glasses; sulfides, for example, molybdenum sulfide or zinc sulfide; barium compounds, for example, barium titanate, barium ferrite, barium sulfate, or heavy spar; metals or metal oxides, for example, particulate or fibrous aluminum, bronze, zinc, copper, or nickel; flaked fillers, for example, glass flakes, flaked silicon carbide, aluminum diboride, aluminum flakes, or steel flakes; or a combination comprising at least one of the foregoing.

The flame retardant composition comprises a phosphorus containing flame retardant. The phosphorus containing flame retardant can comprise an aromatic phosphate ester, for example, of the formula (GO)$_3$P—O, wherein each G is independently an alkyl, cycloalkyl, aryl, alkaryl, or aralkyl group, provided that at least one G is an aromatic group. Two of the G groups can be joined together to provide a cyclic group, for example, diphenyl pentaerythritol diphosphate, which is described by Axelrod in U.S. Pat. No. 4,154,775. The phosphorus containing flame retardant can comprise phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, p-tolyl bis(2,5,5'-trimethylhexyl) phosphate, 2-ethylhexyl diphenyl phosphate, or a combination comprising at least one of the foregoing. A specific aromatic phosphate is one in which each G is aromatic, for example, triphenyl phosphate, tricresyl phosphate, and isopropylated triphenyl phosphate.

Di- or polyfunctional aromatic phosphorus-containing compounds are also useful, for example, compounds of the formulas below:

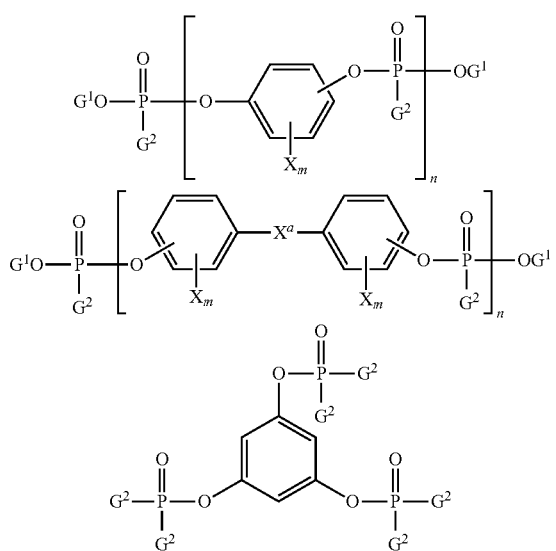

wherein each $G^1$ is independently a hydrocarbon having 1 to 30 carbon atoms; each $G^2$ is independently a hydrocarbon or hydrocarbonoxy having 1 to 30 carbon atoms; each $X^a$ is as defined above; each X is independently a hydrogen; m is 0 to 4, and n is 1 to 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, and their oligomeric and polymeric counterparts.

The phosphorus containing flame retardant can comprise bisphenol A bis(diphenyl phosphate), triphenyl phosphate, resorcinol bis(diphenyl phosphate), tricresyl phosphate, an oligomeric phosphate ester, an aromatic cyclic phosphazene (for example, having the chemical formula $(C_{12}H_{10}NPO_2)_n$, where n is 1 to 3), or a combination comprising at least one of the foregoing.

The phosphorus containing flame retardant can be present in an amount of 5 to 15 wt %, or 5 to 10 wt % based on the total weight of the composition. Within this range, the aromatic phosphate ester can be present in an amount greater than or equal to 8 wt %. Also within this range, the aromatic phosphate ester can be present in an amount less than or equal to 10 wt %.

The flame retardant composition can comprise a perfluoroalkyl sulfonate salt. Perfluoroalkyl sulfonate salts include salts of $C_{2-16}$ alkyl sulfonate salts such as potassium perfluorobutane sulfonate (Rimar salt), potassium perfluoroctane sulfonate, or tetraethylammonium perfluorohexane sulfonate. The perfluoroalkyl sulfonate salt can be present in an amount of 0.3 to 1 wt %, or 0.4 to 0.5 wt % based on the total weight of the composition.

The flame retardant composition can comprise an acid or an acid salt. The acid or acid salt is an inorganic acid or inorganic acid salt. The acid can be an acid comprising a phosphorous containing oxy-acid. For example, the phosphorous containing oxy-acid can comprise a multi-protic phosphorus containing oxy-acid having the general formula (8); wherein m and n are each 2 or greater and t is 1 or greater.

$$H_m P_t O_n \qquad (8)$$

Examples of the acids of formula (8) include, but are not limited to, acids represented by the following formulas: $H_3PO_4$, $H_3PO_3$, and $H_3PO_2$. The acid can comprise phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, fluorohypophosphoric acid, or a combination comprising at least one of the foregoing. Alternatively or in addition to, the acid and acid salt can comprise sulphuric acid, sulphites, mono zinc phosphate, mono calcium phosphate, mono natrium phosphate, or a combination comprising at least one of the foregoing. The weight ratio of an acid or acid salt to the talc can be 0.01 to 0.04. In compositions comprising an aromatic phosphate ester the weight ratio of acid or acid salt to the talc can be 0 to 0.03, or 0.0001 to 0.03.

The flame retardant composition can comprise a zinc borate. The zinc borate can comprise anhydrous zinc borate, zinc borate mono hydrate, or a combination comprising at least one of the foregoing. The zinc borate can be a calcined zinc borate that was calcined such that no water evolves when heated to 350° C. The zinc borate can be present in an amount of 0 to 10 wt %, or 1 to 5 wt %, or 2 to 5 wt % based on the total weight of the composition.

The flame retardant composition can comprise less than or equal to 1,000, or 0 to 900, or 0 to 800 parts per million by weight (ppm) of bromine and/or chlorine based on the total weight of the composition.

The flame retardant composition comprises an anti-drip agent. The anti-drip agent includes a fibril forming or non-fibril forming fluoropolymer such as polytetrafluoroethylene (PTFE). The anti-drip agent can comprise an encapsulated fluoropolymer, for example that is encapsulated by a rigid copolymer, for example, styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, 40 to 60 wt % PTFE and 40 to 60 wt % SAN, based on the total weight of the encapsulated fluoropolymer. The SAN can comprise, for example, 70 to 80 wt % styrene and 20 to 30 wt % acrylonitrile based on the total weight of the copolymer. Alternatively, the fluoropolymer can be pre-blended in some manner with a second polymer, for example, an aromatic polycarbonate resin or SAN to form an agglomerated material for use as an anti-drip agent. Either method can be used to produce an encapsulated fluoropolymer.

The anti-drip agent is present in an amount of 0.1 to 2 wt %, or 0.3 to 1 wt %, or 0.3 to 0.6 wt % based on the total weigh of the flame retardant composition.

The flame retardant composition can comprise a stabilizer, for example, a hindered phenol, a secondary aryl amine, a phosphate, a thioester, or a combination comprising at least one of the foregoing. The stabilizer can comprise an organophosphite (such as tris(nonyl phenyl) phosphite, tris (2,4-di-t-butylphenyl) phosphite, bis(2,4-di-t-butylphenyl) pentaerythritol diphosphite, and distearyl pentaerythritol diphosphite); an alkylated monophenol or polyphenol; an alkylated reaction product of a polyphenol with a diene (such as tetrakis [methylene (3,5-di-tert-butyl-4-hydroxyhydrocinnamate)] methane); a butylated reaction product of para-cresol or dicyclopentadiene; an alkylated hydroquinone; a hydroxylated thiodiphenyl ether; an alkylidenebisphenol; a benzyl compound; an ester of beta-(3,5-di-tert-butyl-4-hydroxyphenyl)-propionic acid with a monohydric or polyhydric alcohol; an ester of beta-(5-tert-butyl-4-hydroxy-3-methylphenyl)-propionic acid with a monohydric or polyhydric alcohol; an ester of a thioalkyl or a thioaryl compound (such as distearylthiopropionate, dilaurylthiopropionate, ditridecylthiodipropionate, octadecyl-3-(3,5-di-tert-butyl-4-hydroxyphenyl) propionate, and pentaerythrityl-tetrakis [3-(3,5-di-tert-butyl-4-hydroxyphenyl) propionate); an amide of beta-(3,5-di-tert-butyl-4-hydroxyphenyl)-propionic acid, a phosphonate (such as dimethylbenzene phosphonate), or a combination comprising at least one of the foregoing.

The stabilizer can comprise a phosphite stabilizer. The phosphite stabilizer can comprise an organophosphite such as triphenyl phosphite, tris(2,6-dimethylphenyl) phosphite, tris(mono-nonylphenyl) phosphite, tris(di-nonyl phenyl) phosphite, tris(2,4-di-t-butylphenyl) phosphite, bis(2,4-di-t-butylphenyl) pentaerythritol diphosphite, distearyl pentaerythritol diphosphite, or a combination comprising at least one of the foregoing.

The flame retardant composition can comprise 0 to 1 wt %, or 0.02 to 1 wt % of the stabilizer based on the total weight of the composition.

The flame retardant composition can comprise an additive such as a charring agent, a hydrated metal oxide, a UV absorbing additive, a plasticizer, a lubricant, a mold release agent, an antistatic agent, a colorant, an impact modifier, or a combination comprising at least one of the foregoing.

The charring agent can comprise a polyetherimide, for example, as described above but that does not comprise siloxane repeat units. An example of such a polyetherimide is ULTEM™ 1010 commercially available from SABIC's Innovative Plastics business. Other charring agents include poly(phenylene ether), poly(phenylenesulfide), polysulphone, polyethersulphone, poly(phenylenesulphide oxide) (PPSO), or phenolic polymers (for example, novolacs). The charring agent can be present in an amount 0 to 10 wt %, or 3 to 6 wt % based on the total weight of the composition.

The flame retardant composition can be prepared by mixing a composition comprising the powdered polycarbonate, the polysiloxane, the talc, the phosphorus containing flame retardant, and the anti-drip agent and then extruding the mixed composition. Alternatively, one or more of the components can be incorporated into the composition by feeding directly into the extruder at the throat and/or downstream through a sidestuffer. The extrudate can then be quenched in a water batch and pelletized. The pellets, so prepared, when cutting the extrudate, can be one-fourth inch long or less as desired. Such pellets can be used for subsequent molding, shaping, or forming.

The flame retardant composition can be formed into an article, for example, using a method such as film or sheet extrusion, injection molding, gas-assist injection molding, extrusion molding, compression molding, and blow molding. Film and sheet extrusion processes can include and are not limited to melt casting, blown film extrusion, and calendering. Co-extrusion and lamination processes can be used to form composite multi-layer films or sheets. Single or multiple layers of coatings can further be applied to the single or multi-layer substrates to impart additional properties such as scratch resistance, ultra violet light resistance, aesthetic appeal, etc. Coatings can be applied through standard application techniques such as rolling, spraying, dipping, brushing, or flow-coating.

The films and sheets described above can further be thermoplastically processed into shaped articles via forming and molding processes including but not limited to thermoforming, vacuum forming, pressure forming, injection molding, or compression molding. Multi-layered shaped articles can also be formed by injection molding a flame retardant composition onto a single or multi-layer film or sheet substrate.

The flame retardant composition can be used in a vehicle, for example, an airplane, a helicopter, a train, a car, a bus, a motorcycle, a truck, or a boat. An article can comprise the flame retardant composition. The article can be a window, a dashboard cover, a window cover, a wall panel, or a door (such as rail, platform, elevator, and cabinet doors). The article can be a window, a partition wall, a ceiling panel, a cabinet wall, a storage compartment, a galley surface, or a light panel. The article can be used in a building. The article can be a construction glazing. The composition can be used in consumer electronics, for example, a cell phone, a computer, a TV, a camera, a printer, or a game console. The composition can be used in electrical/electronics, for example, a desk lamp, an insulation wire, a light switch, a socket, or a surge protector.

The flame retardant composition can achieve a ULV0 rating at a thickness of 1.5 or 0.8 mm as tested in accordance with the procedure of Underwriter's Laboratory Bulletin 94 entitled "Tests for Flammability of Plastic Materials, UL94" with 7 day conditioning.

The flame retardant composition can achieve a maximum average rate heat of emission (MARHE) to be less than 90 kilowatts per meter squared ($kW/m^2$) for hazard level 2 application as determined in accordance with the EN45545 regulation as of March 2016.

The flame retardant composition can pass the OSU 65/65 test achieving a 2 minute integrated heat release rate of less than or equal to 65 kilowatt minutes per meter squared ($kW-min/m^2$) and a peak heat release rate of less than 65 $kW/m^2$. The flame retardant composition can pass the OSU 55/55 test achieving a 2 minute integrated heat release rate of less than or equal to 55 $kW-min/m^2$ and a peak heat release rate of less than 55 $kW/m^2$.

The following examples are provided to illustrate the flame retardant composition comprising the polysiloxane. The examples are merely illustrative and are not intended to limit devices made in accordance with the disclosure to the materials, conditions, or process parameters set forth therein.

EXAMPLES

In the examples, the materials used are presented in Table 1.

TABLE 1

| Component | Description | Source |
|---|---|---|
| THPE Branched PC | Branched BPA polycarbonate made by the interfacial process having a weight average molecular weight (Mw) of 30,000 g/mol as determined by Gel Permeation Chromatography using polycarbonate standards; | SABIC's Innovative Plastics business |

TABLE 1-continued

| Component | Description | Source |
|---|---|---|
| | Structure/Endcap/Branching = interfacial process/HBN endcap/3% THPE branching; and Melt volume flowrate = 5 to 12 cm³/10 min | |
| High flow PC | A low viscosity BPA polycarbonate | SABIC's Innovative Plastics business |
| Low flow PC | A high viscosity BPA polycarbonate | SABIC's Innovative Plastics business |
| Siloxane A | Poly(dimethyl siloxane) with methacrylate functionality (DC4-7081) | Dow Corning Corporation |
| Siloxane B | Polymethylhydrosiloxane (DF1040) | Momentive Performance Materials Inc. |
| Siloxane C | Poly(etherimide-siloxane) copolymer (SILTEM ™ C1180), | SABIC'S Innovative Plastics business |
| Siloxane D | Methyl methacrylate modified silicon acrylate rubber (Metablen SX005) | Mitsubishi chemical Corp. |
| Siloxane E | Styrene-acrylonitrile modified silicon acrylate (Metablen SRK200) | Mitsubishi chemical Corp. |
| Siloxane F | Octaphenylcyclotetrasiloxane (F491) | |
| Siloxane G | Kane Ace MR01 | Keneka |
| Siloxane H | Polymethylphenylsiloxane | |
| Talc | Talc, median particle size 3 micrometers (TALCRON MP 30-36) | Specialty Minerals Inc. |
| PFR-1 | Bisphenol A bis(diphenyl phosphate) (BPADP) | Daihachi Chemical Industry Co. Ltd |
| PFR-2 | Oligomeric phosphate ester (Fyrolflex ™ SolDP) | ICL-IP, Inc. |
| PFR-3 | Aromatic cyclic phosphazene with chemical formula $(C_{12}H_{10}NPO_2)_n$, where n is 1 to 3 (Rabitle ™ FP-110) | Fushimi Pharmaceutical Co., Ltd. |
| Glass fiber | Glass Fiber, 10 micrometer diameter (Chop Vantage HP3786) | PPG Fiber Glass |
| PEI | Polyetherimide (Ultem ™ 1010) | SABIC's Innovative Plastics business |
| ZBH | Zinc borate hydrate (Firebrake ™ ZB) | U.S. Borax Inc. |
| Phosphite Stabilizer | Tris(2,4-di-tert-butylphenyl) phosphite (Irgaphos ™ 168) | Ciba Specialties Chemicals Corp. |
| TSAN | Anti-drip agent, PTFE encapsulated in SAN | SABIC'S Innovative Plastics business |

In the examples, the following test methods were used.

Flammability tests were performed following the procedure of Underwriter's Laboratory Bulletin 94 entitled "Tests for Flammability of Plastic Materials, UL94" with 7 day conditioning. Specimens were preconditioned in an air-circulating oven for 168 hours at 70 degrees Celsius (° C.) and then cooled in the desiccator for at least 4 hours at room temperature, prior to testing. Once removed from the desiccator, specimens were tested within 30 minutes. The data was analyzed by calculation of the average flame out time, standard deviation of the flame out time and the total number of drips. Statistical methods were used to convert the data to a probability that a specific formulation would achieve a first time V0 pass ("p (FTP)") in the standard UL94 testing of 5 bars. In order to achieve a V0 rating, the p (FTP) values was 1 or close to 1, for example, 0.9 to 1 for high confidence that a sample formulation would achieve a V0 rating in UL94 testing. A p (FTP) value below 0.85 for a sample formulation was considered too low to predict a UL94 rating of V0 for that formulation.

Cone calorimetry testing was performed by the Fire Testing Technology (FTT) cone calorimeter. The samples were wrapped in aluminum foil and tested with an applied heat flux of 50 kW/m² in accordance with ISO 5660-1 and EN45545 regulation. The dimensions of the samples were 100×100×3 millimeters (mm) and the distance between the cone heater and sample was 60 mm to accommodate the intumescent char formation. All tests were conducted in horizontal position. According to EN45545 regulation, it requires material to achieve maximum average rate heat of emission (MARHE) to be less than 90 kw/m² for hazard level 2 application.

Heat release testing was performed on 15.2×15.2 centimeter (cm) plaques 1.5 mm thick using the Ohio State University (OSU) rate-of-heat release apparatus, in accordance with the method shown in FAR 25.853 (d), and in Appendix F, section IV (FAR F25.4). Total heat release was measured up to the two-minute mark in kW-min/m². Peak heat release was measured as kW/m². The heat release test method is also described in the "Aircraft Materials Fire Test Handbook" DOT/FAA/AR-00/12, Chapter 5 "Heat Release Test for Cabin Materials." In order to obtain a "pass" for the 65/65 test, the two-minute total heat release had to be less than or equal to 65 kW-min/m² and the peak heat release rate had to be less than or equal to 65 kW/m². In order to obtain a "pass" for the 55/55 test, the two-minute total heat release had to be less than or equal to 55 kW-min/m² and the peak heat release rate had to be less than or equal to 55 kW/m².

Examples 1-9: Effect of Components on Flame Retardancy

Nine different formulations were prepared according to Table 2 and the flame retardant properties were determined.

TABLE 2

| | Example | | | | | | | | |
|---|---|---|---|---|---|---|---|---|---|
| | 1 | 2 | 3 | 4 | 5 | 6 | 7 | 8 | 9 |
| THPE Branched PC | 74.44 | 75.44 | 80.94 | 74.44 | 75.44 | 82.44 | 77.94 | 73.94 | 79.94 |
| Siloxane A | 1 | 1 | 1 | — | — | — | — | — | — |
| Siloxane B | — | — | — | 1 | 1 | 1 | 1 | — | — |
| Siloxane C | — | — | — | — | — | — | — | 2.5 | 2.5 |
| Talc | 12 | 12 | 12 | 12 | 12 | — | — | 12 | — |
| PFR-1 | 8 | — | — | 8 | — | — | — | — | 8 |
| PFR-2 | — | 7 | — | — | 7 | 7 | — | 7 | — |
| PFR-3 | — | — | 1.5 | — | — | — | 1.5 | — | — |
| Glass fiber | — | — | — | — | — | — | 15 | — | — |
| PEI | — | — | — | — | — | 5 | — | — | 5 |
| ZBH | 4 | 4 | 4 | 4 | 4 | 4 | 4 | 4 | 4 |
| Phosphite Stabilizer | 0.06 | 0.06 | 0.06 | 0.06 | 0.06 | 0.06 | 0.06 | 0.06 | 0.06 |
| TSAN | 0.5 | 0.5 | 0.5 | 0.5 | 0.5 | 0.5 | 0.5 | 0.5 | 0.5 |
| UL94, 1.5 mm | V0 | V0 | V0 | V0 | V0 | V0 | V0 | V0 | V0 |
| UL94, 0.8 mm | V0 | V0 | V1 | V0 | V0 | V0 | V0 | V0 | V0 |
| Cone test-MARHE (kW/m$^2$) | 80 | 76 | 112 | 78 | 82 | 106 | 83 | 73 | 114 |
| OSU Total heat release (kW-min/m$^2$) | 50 | 50 | X | 55 | 52 | X | X | 50 | X |
| OSU Peak heat release (kW/m$^2$) | 60 | 54 | X | 52 | 51 | X | X | 54 | X |

Table 2 shows that Examples 1, 2, 4, 5, and 8 comprising a branched polycarbonate, a polysiloxane, talc, a phosphorus containing flame retardant, and an anti-drip agent were all able to pass the stringent OSU 65/65 test for total heat release and peak heat release and further, that Examples 2, 4, 5, and 8 were also able to pass the even more stringent OSU 55/55 test for total heat release and peak heat release. Example 3, that only comprised 1.5 wt % of the phosphorus containing flame retardant, was not able to pass the EN45545 hazard level 2 (HL2) MARHE test (less than or equal to 90 kW/m$^2$) and the OSU 65/65 test and in fact, did not even obtain a UL 94 V0 rating at 0.8 mm. Examples 6, 7, and 9 that did not contain talc were also not able to pass the EN45545 hazard level 2 (HL2) MARHE test (less than or equal to 90 kW/m$^2$) and the OSU 65/65 test.

Examples 10-15: Effect of Varying the Siloxane a Concentration

Six different formulations were prepared according to Table 3 and the flame retardant properties were determined.

TABLE 3

| | Example | | | | | | |
|---|---|---|---|---|---|---|---|
| | 10 | 11 | 12 | 1 | 13 | 14 | 15 |
| THPE Branched PC | 75.44 | 75.34 | 74.94 | 74.44 | 74.44 | 73.44 | 70.44 |
| Siloxane A | — | 0.1 | 0.5 | 1.0 | 1.0 | 2.0 | 5.0 |
| Talc | 12 | 12 | 12 | 12 | 12 | 12 | 12 |
| PFR-1 | 8 | 8 | 8 | 8 | 8 | 8 | 8 |
| ZBH | 4 | 4 | 4 | 4 | 4 | 4 | 4 |
| Phosphite Stabilizer | 0.06 | 0.06 | 0.06 | 0.06 | 0.06 | 0.06 | 0.06 |
| TSAN | 0.5 | 0.5 | 0.5 | 0.5 | 0.5 | 0.5 | 0.5 |
| UL94, 0.8 mm | V0 | V0 | V0 | V0 | V0 | V0 | V0 |
| UL94, 0.4 mm | — | V2 | V2 | V0 | V2 | V2 | V2 |
| Cone test-MARHE (kW/m$^2$) | 91 | 77 | 87 | 80 | 84 | 66 | 77 |
| OSU Total heat release (kW-min/m$^2$) | 79 | 58 | 54 | 50 | 100 | 62 | 83 |
| OSU Peak heat release (kW/m$^2$) | 115 | 73 | 83 | 60 | 114 | 78 | 90 |

Examples 16-21: Effect of Varying the Siloxane B Concentration

Six different formulations were prepared according to Table 4 and the flame retardant properties were determined.

TABLE 4

| | Example | | | | | | |
|---|---|---|---|---|---|---|---|
| | 16 | 17 | 18 | 5 | 19 | 20 | 21 |
| THPE Branched PC | 76.44 | 76.34 | 75.94 | 75.44 | 75.44 | 74.44 | 71.44 |
| Siloxane B | — | 0.1 | 0.5 | 1.0 | 1.0 | 2.0 | 5.0 |
| Talc | 12 | 12 | 12 | 12 | 12 | 12 | 12 |
| PFR-2 | 7 | 7 | 7 | 7 | 7 | 7 | 7 |
| ZBH | 4 | 4 | 4 | 4 | 4 | 4 | 4 |
| Phosphite Stabilizer | 0.06 | 0.06 | 0.06 | 0.06 | 0.06 | 0.06 | 0.06 |
| TSAN | 0.5 | 0.5 | 0.5 | 0.5 | 0.5 | 0.5 | 0.5 |
| UL94, 0.8 mm | V0 | V0 | V0 | V0 | V0 | V0 | V0 |
| UL94, 0.4 mm | V2 | V2 | — | — | V2 | V1 | VNOT |
| Cone test-MARHE (kW/m$^2$) | 71 | 59 | 68 | 82 | 72 | 75 | 138 |
| OSU Total heat release (kW-min/m$^2$) | 43 | 50 | 29 | 52 | 27 | 35 | 71 |
| OSU Peak heat release (kW/m$^2$) | 77 | 76 | 63 | 51 | 77 | 66 | 138 |

Examples 22-25: Effect of Varying the Polycarbonate and the Siloxane

Six different formulations were prepared according to Table 5 and the flame retardant properties were determined. The polycarbonate comprised a mixture of the high flow PC and the low flow PC.

TABLE 5

| Example | 22 | 23 | 24 | 25 |
|---|---|---|---|---|
| High flow PC | 37.72 | 37.72 | 37.82 | 37.72 |
| Low flow PC | 37.72 | 37.72 | 37.82 | 37.72 |
| Siloxane A | — | 1.0 | — | — |
| Siloxane B | — | — | — | 1.0 |
| Talc | 12 | 12 | 12 | 12 |
| PFR-1 | 8 | 8 | — | — |
| PFR-2 | — | — | 7 | 7 |
| ZBH | 4 | 4 | 4 | 4 |
| Phosphite Stabilizer | 0.06 | 0.06 | 0.06 | 0.06 |
| TSAN | 0.5 | 0.5 | 0.5 | 0.5 |
| UL94, 0.8 mm | V0 | V0 | V0 | V0 |
| Cone test-MARHE (kW/m$^2$) | 74 | 64 | 80 | 65 |
| OSU Total heat release (kW-min/m$^2$) | 85 | 119 | 88 | 80 |
| OSU Peak heat release (kW/m$^2$) | 80 | 85 | 77 | 84 |

Table 5 shows that the compositions had UL94 V0 rating at 0.8 mm.

Examples 26-31: Effect of Varying the Siloxane

Six different formulations were prepared according to Table 6 and the flame retardant properties were determined.

TABLE 6

| | Example | | | | | |
|---|---|---|---|---|---|---|
| | 26 | 27 | 28 | 29 | 30 | 31 |
| THPE Branched PC | 72.6 | 72.6 | 74.44 | 74.44 | 74.44 | 74.44 |
| Siloxane D | 4.7 | — | — | 1 | — | — |
| Siloxane E | — | 4.6 | — | — | — | — |
| Siloxane F | — | — | 1 | — | — | — |
| Siloxane G | — | — | — | — | 1 | — |
| Siloxane H | — | — | — | — | — | 1 |
| Talc | 10 | 10 | 12 | 12 | 12 | 12 |
| PFR-1 | 10 | 10 | 8 | 8 | 8 | 8 |
| ZBH | 2 | 2 | 4 | 4 | 4 | 4 |
| Phosphite Stabilizer | 0.3 | 0.3 | 0.06 | 0.06 | 0.06 | 0.06 |
| TSAN | 0.4 | 0.4 | 0.5 | 0.5 | 0.5 | 0.5 |
| UL94, 0.8 mm | V0 | V0 | V0 | V0 | V0 | V0 |
| Cone test-MARHE (kW/m$^2$) | 90 | 93 | 83 | 77 | 63 | 99 |
| OSU Total heat release (kW-min/m$^2$) | 59 | 46 | 73 | 72 | 78 | 71 |
| OSU Peak heat release (kW/m$^2$) | 91 | 88 | 89 | 94 | 90 | 78 |

Table 5 shows that the compositions had UL94 V0 rating at 0.8 mm.

Set forth below are various non-limiting aspects of the present disclosure.

Aspect 1: A flame retardant composition, comprising: 60 to 95 wt % of an optionally branched polycarbonate based on the total weight of the flame retardant composition; a polysiloxane, wherein the polysiloxane comprises a repeat unit of the formula (7); wherein E has an average value of 2 to 100; R' is hydrogen or a $C_{1-4}$ alkyl group; and R" is a $C_{1-4}$ alkyl group; wherein the composition comprises 0.5 to 2 wt % of the repeat unit of the formula (7) of the polysiloxane based on the total weight of the flame retardant composition; wherein the polysiloxane is free of one or both of a vinyl graft and repeat units derived from a vinyl monomer; 9 to 18 wt % of talc based on the total weight of the flame retardant composition; 5 to 15 wt % of a phosphorus containing flame retardant based on the total weight of the flame retardant composition; 0 to 1 wt % of a phosphite stabilizer based on the total weight of the flame retardant composition; and 0.1 to 2 wt % of an anti-drip agent based on the total weight of the flame retardant composition.

Aspect 2: The flame retardant composition of Aspect 1, wherein the polysiloxane comprises a polydimethylsiloxane, wherein R' and R" are methyl.

Aspect 3: The flame retardant composition of any one of the preceding aspects, wherein the polysiloxane comprises a polymethylhydrosiloxane wherein R' is hydrogen and R" is methyl.

Aspect 4: The flame retardant composition of any one of the preceding aspects, wherein the polysiloxane comprises a (meth)acrylate functionality.

Aspect 5: The flame retardant composition of any one of the preceding aspects, wherein the polysiloxane comprises a poly(etherimide-siloxane) copolymer comprising repeat units of the formula (41); wherein R is a substituted or unsubstituted divalent organic group and T is —O— or a group of the formula —O—Z—O— and wherein Z is a substituted or unsubstituted divalent organic group.

Aspect 6: The flame retardant composition of Aspect 5, wherein R is a substituted or unsubstituted $C_{6-20}$ aromatic hydrocarbon group, a substituted or unsubstituted $C_{4-20}$ alkylene group, a substituted or unsubstituted $C_{3-8}$ cycloalkylene group, or a halogenated derivative of any of the foregoing; and wherein Z is an aromatic $C_{6-24}$ monocyclic or polycyclic moiety optionally substituted with one or both of 1 to 6 $C_{1-8}$ alkyl groups and 1 to 8 halogen atoms, provided that the valence of Z is not exceeded.

Aspect 7: The flame retardant composition of any one of Aspects 5 to 6, wherein Z is a residue of a dihydroxy compound of formula (43); wherein $R^a$ and $R^b$ are each independently a halogen atom or a monovalent $C_{1-6}$ alkyl group; p and q are each independently integers of 0 to 4; c is 0 to 4; and $X^a$ is a bridging group connecting the hydroxy-substituted aromatic groups, where the bridging group and the hydroxy substituent of each $C_6$ arylene group are each independently disposed ortho, meta, or para to each other on the respective $C_6$ arylene groups.

Aspect 8: The flame retardant composition of any one of Aspects 5 to 7, wherein the poly(etherimide-siloxane) copolymer has the formula (49) or (50); wherein R is a substituted or unsubstituted $C_{6-20}$ aromatic hydrocarbon group, a substituted or unsubstituted $C_{4-20}$ alkylene group, a substituted or unsubstituted $C_{3-8}$ cycloalkylene group, or a halogenated derivative of any of the foregoing; R' is hydrogen or a $C_{1-4}$ alkyl group; R" is a $C_{1-4}$ alkyl group; each $R^4$ is independently a $C_{2-20}$ arylene, alkylene, or arylenealkylene group; each Z is independently an aromatic $C_{6-24}$ monocyclic or polycyclic moiety optionally substituted with one or both of 1 to 6 $C_{1-8}$ alkyl groups and 1 to 8 halogen atoms, provided that the valence of Z is not exceeded; E has an average value of 2 to 50; and n is an integer from 5 to 100.

Aspect 9: The flame retardant composition of Aspect 8, wherein R is a phenylene group; R' is a methyl group; R" is a methyl group; each $R^4$ is n-propylene; and each Z is a residue of bisphenol A.

Aspect 10: The flame retardant composition of any one of the preceding aspects, wherein the polycarbonate comprises a branched polycarbonate, wherein the branched polycarbonate optionally comprises a bisphenol A homopolymer comprising branching units derived from 1,1,1-tris(4-hydroxyphenyl) ethane.

Aspect 11: The flame retardant composition of any one of the preceding aspects, wherein the polycarbonate comprises a branched polycarbonate, wherein the branched polycarbonate optionally has a branching level of 2 to 6%, wherein the branching level is equal to the total moles of branching units divided by the total moles of bisphenol repeat units times 100.

Aspect 12: The flame retardant composition of any one of the preceding aspects, wherein the composition comprises 70 to 85 wt % of the polycarbonate.

Aspect 13: The flame retardant composition of any one of the preceding aspects, wherein the polycarbonate has a weight average molecular weight of 20,000 to 40,000 g/mol as measured by gel permeation chromatography using polycarbonate standards.

Aspect 14: The flame retardant composition of any one of the preceding aspects, wherein the polycarbonate comprises an end-capping agent comprising phenol, p-t-butylphenol, p-cumylphenol, or a combination comprising at least one of the foregoing.

Aspect 15: The flame retardant composition of any one of the preceding aspects, wherein composition comprises 10 to 15 wt % of the talc having a median particle size of 0.5 to 10 micrometers.

Aspect 16: The flame retardant composition of any one of the preceding aspects, wherein the composition comprises 0.02 to 1 wt % of the phosphite stabilizer.

Aspect 17: The flame retardant composition of any one of the preceding aspects, wherein the composition comprises 0.1 to 1 wt % of the anti-drip agent.

Aspect 18: The flame retardant composition of any one of the preceding aspects, wherein the anti-drip agent comprises an encapsulated fluoropolymer.

Aspect 19: The flame retardant composition of any one of the preceding aspects, wherein the phosphorus containing flame retardant comprises bisphenol A bis(diphenyl phosphate), triphenyl phosphate, resorcinol bis(diphenyl phosphate), tricresyl phosphate, an oligomeric phosphate ester, or a combination comprising at least one of the foregoing.

Aspect 20: The flame retardant composition of any one of the preceding aspects, wherein the composition passes one or more of the OSU 65/65 test achieving a 2 minute integrated heat release rate of less than or equal to 65 kilowatt-minutes per square meter and a peak heat release rate of less than 65 kilowatts per square meter, the OSU 55/55 test achieving a 2 minute integrated heat release rate of less than or equal to 55 kilowatt-minutes per square meter and a peak heat release rate of less than 55 kilowatts per square meter, and the EN45545 hazard level 2 requirement with Cone calorimeter test achieving a maximum average rate of heat emission of less than or equal to 90 kilowatts per square meter.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

"Optional" or "optionally" means that the subsequently described event or circumstance may or may not occur, and that the description includes instances where the event occurs and instances where it does not. The term "combination" is inclusive of blends, mixtures, alloys, reaction products, and the like. Also, "combinations comprising at least one of the foregoing" or "at least one of" means that the list is inclusive of each element individually, as well as combinations of two or more elements of the list, and combinations of at least one element of the list with like elements not named.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges, for example, ranges of "up to 25 wt %, or 5 to 20 wt %" is inclusive of the endpoints and all intermediate values of the ranges of "5 to 25 wt %," such as 10 to 23 wt %, etc. Unless defined otherwise, technical and scientific terms used herein have the same meaning as is commonly understood by one of skill in the art to which this disclosure belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_{1-10}$ alkyl" refers to a $C_{1-10}$ alkyl group substituted with $C_{6-12}$ aryl group, the total number of carbon atoms in the resulting aryl-substituted alkyl group is $C_{7-22}$.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P. As used herein, the term "(meth)acryl" encompasses both acryl and meth acryl groups. "Acryloyloxy" means a monovalent acryloyl group linked via an oxygen (i.e., acryloyl-O—), for example, $CH_2$=CH—CO—O— or $CH_2$—$CCH_3$—CO—O—.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A flame retardant composition, comprising:
   73 to 83 wt % of a polycarbonate based on the total weight of the flame retardant composition;
   a polysiloxane, wherein the polysiloxane comprises a repeat unit of the formula (7);

wherein E has an average value of 2 to 100; R' is hydrogen or a $C_{1-4}$ alkyl group; and R" is a $C_{1-4}$ alkyl group; wherein the composition comprises 0.5 to 2 wt % of the repeat unit of the formula (7) of the polysiloxane based on the total weight of the flame retardant composition; wherein the polysiloxane is free of one or both of a vinyl graft and repeat units derived from a vinyl monomer;
11 to 13 wt % of talc based on the total weight of the flame retardant composition;
5 to 10 wt % of a phosphorus containing flame retardant comprising bisphenol A bis(diphenyl phosphate) or an oligomer phosphate ester, based on the total weight of the flame retardant composition;
0.02 to 1 wt % of a phosphite stabilizer based on the total weight of the flame retardant composition;
0.3 to 0.6 wt % of an anti-drip agent comprising an encapsulated fluoropolymer based on the total weight of the flame retardant composition; and
1 to 5 wt % of zinc borate based on the total weight of the flame retardant composition,
wherein the flame retardant composition is free of bromine,
wherein the composition passes the OSU 55/55 test achieving a 2 minute integrated heat release rate of less than or equal to 55 kilowatt-minutes per square meter and a peak heat release rate of less than 55 kilowatts per square meter, and wherein the polycarbonate comprises a branched polycarbonate, wherein the branched polycarbonate has a branching level of 2 to 6%, wherein the branching level is equal to the total moles of branching units divided by the total moles of bisphenol repeat units times 100.

2. The flame retardant composition of claim 1, wherein the polysiloxane comprises a polydimethylsiloxane wherein R' and R" are methyl.

3. The flame retardant composition of claim 1, wherein the polysiloxane comprises a polymethylhydrosiloxane wherein R' is hydrogen and R" is methyl.

4. The flame retardant composition of claim 1, wherein the polysiloxane comprises a (meth)acrylate functionality.

5. The flame retardant composition of claim 1, wherein the polysiloxane comprises a poly(etherimide-siloxane) copolymer comprising repeat units of the formula (41);

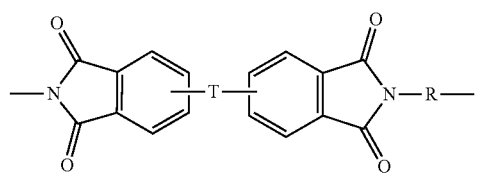
(41)

wherein R is a substituted or unsubstituted divalent organic group and T is —O— or a group of the formula —O—Z—O— and wherein Z is a substituted or unsubstituted divalent organic group.

6. The flame retardant composition of claim 5, wherein R is a substituted or unsubstituted $C_{6-20}$ aromatic hydrocarbon group, a substituted or unsubstituted $C_{4-20}$ alkylene group, a substituted or unsubstituted $C_{3-8}$ cycloalkylene group, or a halogenated derivative of any of the foregoing; and wherein Z is an aromatic $C_{6-24}$ monocyclic or polycyclic moiety optionally substituted with one or both of 1 to 6 $C_{1-8}$ alkyl groups and 1 to 8 halogen atoms, provided that the valence of Z is not exceeded.

7. The flame retardant composition of claim 5, wherein Z is a residue of a dihydroxy compound of formula (43);

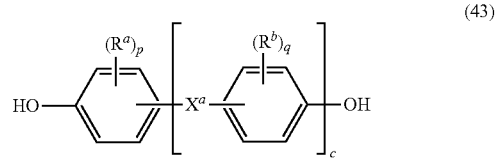
(43)

wherein $R^a$ and $R^b$ are each independently a halogen atom or a monovalent $C_{1-6}$ alkyl group; p and q are each independently integers of 0 to 4; c is 0 to 4; and $X^a$ is a bridging group connecting the hydroxy-substituted aromatic groups, where the bridging group and the hydroxy substituent of each $C_6$ arylene group are each independently disposed ortho, meta, or para to each other on the respective $C_6$ arylene groups.

8. The flame retardant composition of claim 5, wherein the poly(etherimide-siloxane) copolymer has the formula (49) or (50);

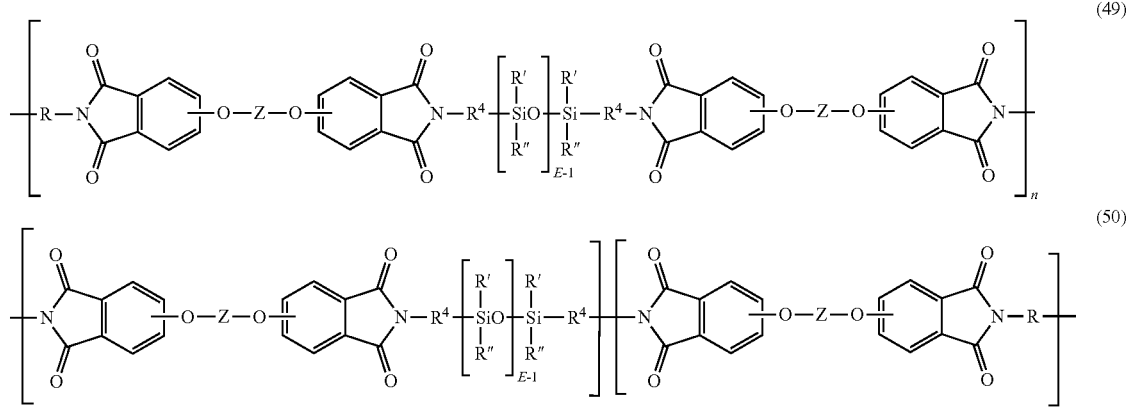

wherein R is a substituted or unsubstituted $C_{6-20}$ aromatic hydrocarbon group, a substituted or unsubstituted $C_{4-20}$ alkylene group, a substituted or unsubstituted $C_{3-8}$ cycloalkylene group, or a halogenated derivative of any of the foregoing; R' is hydrogen or a $C_{1-4}$ alkyl group; R" is a $C_{1-4}$ alkyl group; each $R^4$ is independently a $C_{2-20}$ arylene, alkylene, or arylenealkylene group; each Z is independently an aromatic $C_{6-24}$ monocyclic or polycyclic moiety optionally substituted with one or both of 1 to 6 $C_{1-8}$ alkyl groups and 1 to 8 halogen atoms, provided that the valence of Z is not exceeded; E has an average value of 2 to 50; and n is an integer from 5 to 100.

9. The flame retardant composition of claim 8, wherein R is a phenylene group; R' is a methyl group; R" is a methyl group; each $R^4$ is n-propylene; and each Z is a residue of bisphenol A.

10. The flame retardant composition of claim 1, wherein the branched polycarbonate comprises a bisphenol A homopolymer comprising branching units derived from 1,1,1-tris(4-hydroxyphenyl) ethane.

11. The flame retardant composition of claim 1, wherein the polycarbonate has a weight average molecular weight of 20,000 to 40,000 g/mol as measured by gel permeation chromatography using polycarbonate standards.

12. The flame retardant composition of claim 1, wherein the polycarbonate comprises an end-capping agent comprising phenol, p-t-butylphenol, p-cumylphenol, or a combination comprising at least one of the foregoing.

13. The flame retardant composition of claim 1, wherein the phosphorus containing flame retardant further comprises triphenyl phosphate, resorcinol bis(diphenyl phosphate), tricresyl phosphate, or a combination comprising at least one of the foregoing.

14. The flame retardant composition of claim 1, wherein the composition passes the EN45545 hazard level 2 requirement with Cone calorimeter test achieving a maximum average rate of heat emission of less than or equal to 90 kilowatts per square meter.

* * * * *